United States Patent
Matsui et al.

(10) Patent No.: US 6,943,795 B1
(45) Date of Patent: Sep. 13, 2005

(54) SCREEN DISPLAY CONTROL AND TRANSITION METHOD AND ITS SYSTEM

(75) Inventors: Hayaki Matsui, Nagoya (JP); Norio Danbara, Owariasahi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/648,612

(22) Filed: Aug. 28, 2000

(30) Foreign Application Priority Data

Oct. 6, 1999 (JP) .................................. 11-285331

(51) Int. Cl.$^7$ .......................................... G06T 15/70
(52) U.S. Cl. ...................... 345/475; 345/901; 345/902; 345/903; 705/43
(58) Field of Search ........................ 345/902, 810–845, 345/328, 475, 901, 903; 705/43

(56) References Cited

U.S. PATENT DOCUMENTS

| | | | | |
|---|---|---|---|---|
| 5,041,967 A | * | 8/1991 | Ephrath et al. | 345/825 |
| 5,872,565 A | * | 2/1999 | Greaves et al. | 345/328 |
| 6,334,117 B1 | * | 12/2001 | Covert et al. | 705/43 |

FOREIGN PATENT DOCUMENTS

| | | | | |
|---|---|---|---|---|
| JP | 10-143359 | | 5/1998 | |
| JP | 10143359 A | * | 5/1998 | G06F 09/06 |
| JP | 11-102289 | | 4/1999 | |
| JP | 99-44748 | | 6/1999 | |
| WO | WO 99/27438 | | 6/1999 | |

OTHER PUBLICATIONS

Kottler et al., Microsoft Visual InterDev Unleashed, 1997, Sams.net Publishing, chapter 19, pp. 1-16.*
Powell, HTML: The Complete Reference, 1998,The McGraw-Hill Companies, chapter 9, pp. 1-12 and chapter 8, p. 4.*

* cited by examiner

Primary Examiner—Kimbinh T. Nguyen
(74) Attorney, Agent, or Firm—Mattingly, Stanger, Malur & Brundidge, P.C.

(57) ABSTRACT

An image display control method and its system for this method in an information processing unit sequentially changing a series of image contents to display images on the screen. Image content information for displaying image contents on the information processing unit and screen transition process information for performing an screen transition process on a series of image contents are made separate and generated separately. One frame of the display image of the information processing unit consists of one parent frame and two child frames in the parent frame. The image content information is stored in one child frame and the screen transition process information is stored in the other child frame, and a series of image contents is sequentially moved to display images on the screen.

5 Claims, 13 Drawing Sheets

FIG. 3A

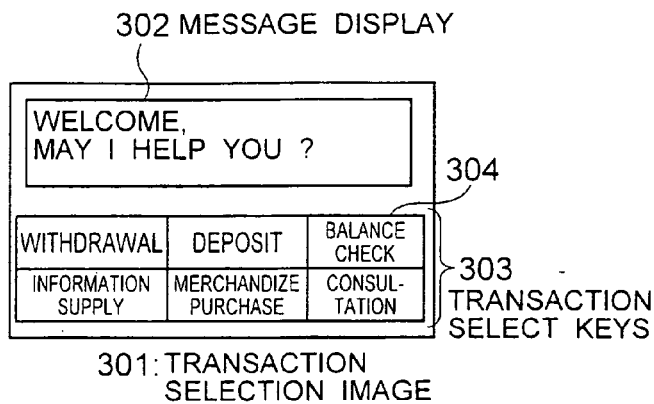

301: TRANSACTION SELECTION IMAGE

- 302 MESSAGE DISPLAY: "WELCOME, MAY I HELP YOU ?"
- 303 TRANSACTION SELECT KEYS
- 304

FIG. 3B

PRESS BALANCE CHECK KEY ↓

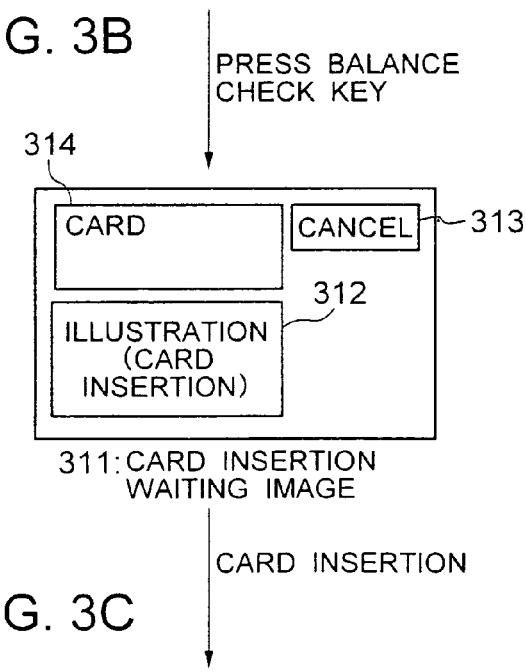

311: CARD INSERTION WAITING IMAGE
- 313 CANCEL
- 314 CARD
- 312 ILLUSTRATION (CARD INSERTION)

CARD INSERTION ↓

FIG. 3C

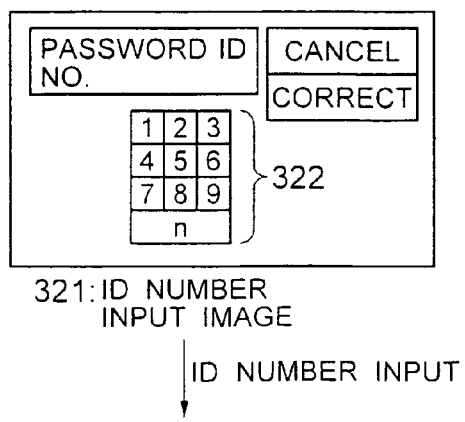

321: ID NUMBER INPUT IMAGE
- 322

ID NUMBER INPUT ↓

FIG. 3D

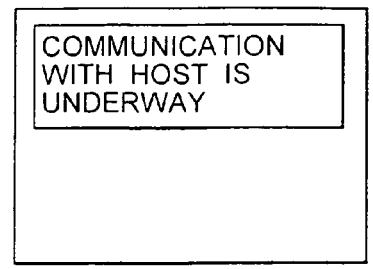

331: HOST TRANSMISSION/ RECEPTION IMAGE

"COMMUNICATION WITH HOST IS UNDERWAY"

TRANSMISSION/ RECEPTION TERMINATED ↓

FIG. 3E

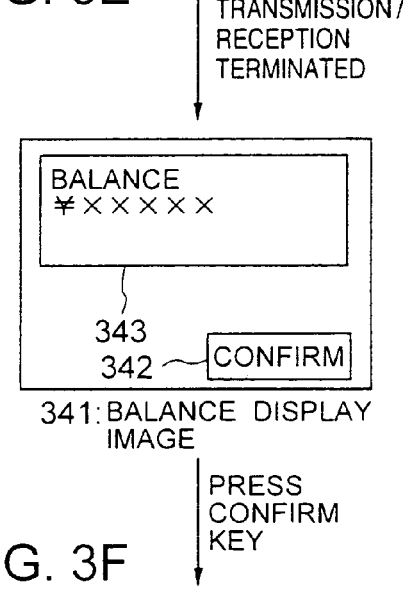

341: BALANCE DISPLAY IMAGE
- BALANCE ¥×××××
- 343
- 342 CONFIRM

PRESS CONFIRM KEY ↓

FIG. 3F

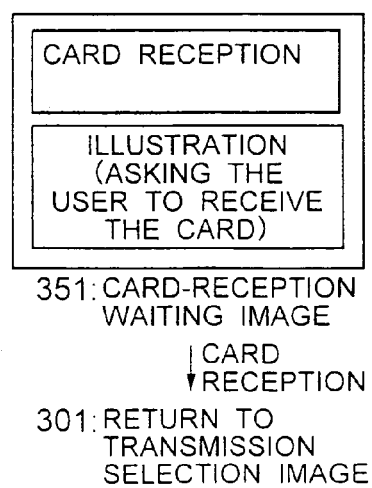

351: CARD-RECEPTION WAITING IMAGE
- CARD RECEPTION
- ILLUSTRATION (ASKING THE USER TO RECEIVE THE CARD)

CARD RECEPTION ↓

301: RETURN TO TRANSMISSION SELECTION IMAGE

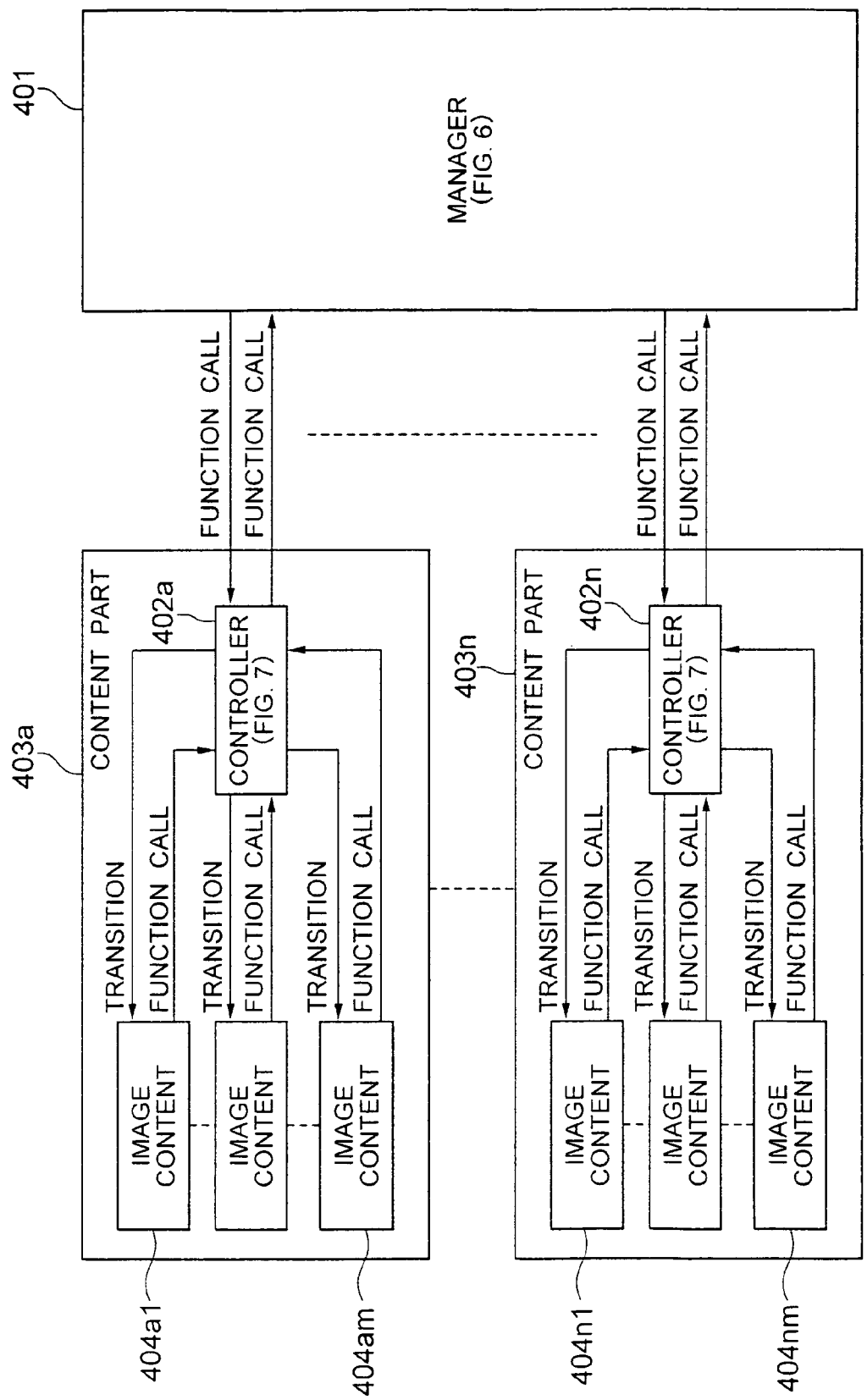

FIG. 5

```
<HTML>
<HEAD></HEAD>

<FRAMESET COLS="0,*" BORDER=1>
<FRAME SRC="Manager.asp"
SCROLLING="AUTO" NAME="Manager" MARGINWIDTH="2" MARGINHEIGHT="20">
<FRAME SRC="Menu.htm"
SCROLLING="AUTO" NAME="View" MARGINWIDTH="2" MARGINHEIGHT="20">
</FRAMESET>

</HTML>
```

(TRANSACTION PROCESS UNIT)
TRANSACTION NAME : BALANCE INQUIRY — 602

| No. | CONTENT PART | END OF PROCESS | RESTART |
|---|---|---|---|
| 1 | Waitingforcardinsertion | 2 | 6 |
| 2 | Idnumberinput | 3 | 6 |
| 3 | Transmissionreceptionwithhost | 4 | 6 |
| 4 | Balancedisplay | 5 | |
| 5 | Waitingforthecardtobereceived | | |
| 6 | Restart | | |

FIG. 8

MANAGER. ASP

```
<HTML>
<SCRIPT language="VBScript">
<!--#INCLUDE FILE="Cardsounyuu.asp"-->
<!--#INCLUDE FILE="AnshouNyuuryoku.asp"-->
<!--#INCLUDE FILE="HostSoujushin.asp"-->
<!--#INCLUDE FILE="ZandakasHyouji.asp"-->
<!--#INCLUDE FILE="BeitaiUketori.asp"-->
<!--#INCLUDE FILE="Seikaishi.asp"-->
<!--#INCLUDE FILE="Shougai.asp"-->

Sub Manager (ManagerID, ContentsParts, Code)
If (Code="Fault") then
    Shougai "Start","Balance Check"
End If
Select Case Manager ID
Case "Balance Inquiry"
    Select Case ContentsParts
    Case "Start"
        CardSounyuu "Start","Balance Check"
    Case "Waiting For Card Insertion"
        Select Case Code
        Case "End Of Process"
            AnshouNyuuryoku "Start", "Balanced Check"
        Case "Restart"
            Saikaishi "Start", "Balanced Check"
        End Select
    Case "ID Number Input"
    Select Case Code
    Case "End Of Process"
        Host Soujushin "Start", "Balanced Check"
    Case "Restart"
        Saikaishl "Start", "Blanced Check"
    End Select
```

(CONTINUED TO THE TOP OF THE RIGHT COLUMN )

(CONTINUED FROM THE LEFT COLUMN )

```
    Case "Transmission Reception To Host"
        Select Case Code
        Case "End Of Process"
            ZandakaHyouji "Start", "Balance Inquiry"
        Case "Restart"
            Saikaishi "Start", "Balance Inquiry"
        End Select
    Case "Balanced Display"
        Select Case Code
        Case "End Of Process"
            BaitaiUketori "Start", "Balance Inquiry"
        Case "Restart"
            Saikaishi "Start", "Balance Inquiry"
        End Select
    Case Waiting For Medium Reception
        Select Case Code
        End Select
    End Select
    Case "Restart"
        Select Case Code
        End Select
    End Select
End Select
End Sub
</SCRIPT>
</HTML>
```

FIG. 9

CardSounyuu.asp

```
Sub CardSounyuu (Gamen, Code)
    Select Case Gamen
    Case "Start"
        Session("Yobidashi Manager")=Code
        top.view.location = "CardSounyuu1Gamen.htm]"
    Case "Card Insertion Wating Image 1"
        Select Case Code
        Case "End of Process"
            top. View, location="CardSounyuu2Gamen.htm]"
        Case Else
            top.Manager.Manager Session("YobidashiManager") "Wating For Card insertion" Code
        End Select
    Case "Card Insertion Wating Image 2"
        Select Case Code
        Case "End Of Process"
            top. View. location = "CardSounyuu3Gamen.htm]"
        Case Else
            top.Manager.Manager Session("YobidashiManager"),"Wating For Card insertion" Code
        End Select
    Case "Card Insertion Wating Image 3"
        Select Case Card
        Case Else
            top.Manager.Manager Session("YobidashiManager") "Wating For Card insertion" Code
        End Select
    Case Else
        top.Manager.Manager Session("YobidashiManager"),"Wating For Card insertion" Code
    End Select
End Sub
```

SCREEN DISPLAY CONTROL AND TRANSITION METHOD AND ITS SYSTEM

BACKGROUND OF THE INVENTION

Field of the Invention

The present invention relates to a method for realizing screen transitions on the WWW (World Wide Web) browser on the screen of an automatic teller machine (hereafter referred to as a Web-compatible ATM), which incorporates a WWW browser to make use of the Internet.

Of late the spread of the Internet is remarkable indeed, and progress has been made in the use of the Internet by ATMs (Automated Teller Machines) and the terminals of information supply service.

It is possible to easily create a home page using HTML (HyperText Markup Language) to transmit information over the Internet.

If a WWW browser is loaded in the ATM, information available over the Internet can be displayed on the ATM screen. Moreover, financial institutions are expected to become capable of providing new service by use of the Internet, and adding and changing the screen images of the ATM by adopting HTML.

A file written in HTML (a HTML file) has a layout of objects (keys and specific areas of text) and describes the processes to be executed when events (a key being pressed, the occurrence of time-out, etc.) related to the objects occur.

To show a process which is executed when an event occurs as an example, when a given key is pressed, the characters corresponding to this key are displayed sequentially or the current image shifts to the next image on the WWW browser screen.

In an screen transition control unit disclosed in JP-A-10-143359, it is proposed to provide an image content generator, an screen transition process generator and a process module generator, and arrange for an screen transition program to be created when an screen transition process is generated supposing that the designer has prepared a flowchart showing an screen transition process.

Generally, in an HTML file, even when an image of the same content is used several times, if the image differs at the transition destination depending on the situation where the image is used, a problem is that original images must be prepared as many as are required at the transition destination.

On the other hand, in the screen transition control unit in JP-A-10-143359, though the screen transition process is shown as a flowchart, this method leaves a possibility of omitting a description of some process corresponding to an event that occurs in a given image and another problem with this method is that it requires specific process modules when generated screen transitions are put into practice.

SUMMARY OF THE INVENTION

An object of the present invention is to divide HTML information into an HTML file describing an image content and an HTML file describing an screen transition process to thereby increase the independence and reusability of images.

Another object of the present invention is to adopt a table form to create an HTML file describing an screen transition process to thereby eliminate an omission of description of transition destinations corresponding to events.

To achieve the above objects, according to an aspect of the present invention, there is provided a screen display control method in an information processing unit sequentially changing over a series of image contents to display images on the screen, wherein image content information and screen transition process information, said screen transition process information being used to perform the screen transition process, are separate and generated separately, and wherein the frame layout of an image is composed of a parent frame and two child frames in the parent frame and the above-mentioned image content information is stored in one child frame and the above-mentioned screen transition process information is stored in the other child frame.

In a second aspect of the present invention, there is provided a method for generating an screen transition program to carry out the screen transition process in an information processing unit sequentially shifting a series of image contents to display images on the screen. This method comprises storing a sheet describing the processing items in the screen transition process in a table form and an screen transition program generator in a file, wherein the screen transition program generator sequentially reads the processing items from the sheet, sequentially writes in the file a necessary program descriptions corresponding to the read processing items, and generates an screen transition program on the file.

In a third aspect of the present invention, there is provided a method for generating an screen transition program to carry out the screen transition process in the information processing unit sequentially changing a series of image contents to display images on the screen. This method comprises storing content-parts in the screen transition process and a manager sheet describing in table form events that occur in the content part as processing items, and a controller sheet describing the processing items in the content part in table form and an screen transition program generator in a file, wherein the screen transition program generator sequentially reads the processing items described in the manager sheet, sequentially writes, in the file, necessary program descriptions corresponding to the read processing items, generates a manager, and sequentially reads the processing items described in the controller sheet, sequentially writes, in the file, necessary program descriptions corresponding to the read processing items, generates a controller, and generates an screen transition program consisting of the manager and the controller on the file.

BRIEF DESCRIPTION OF THE DRAWINGS

FIGS. 3A, 3B, 3C, 3D, 3E, 3F are diagrams showing an example of screen transitions of banking transactions, provided by the Web-compatible ATM;

FIG. 4 is a diagram showing the call relations by which to realize the image contents and screen transitions that appear on the Web-compatible ATM;

FIG. 5 is a diagram showing a method for installing an HTML file to realize the frame layout shown in FIG. 2;

FIG. 6 is a diagram showing an example of a manager sheet;

FIG. 8 is a diagram showing an example of an screen transition program generated based on the manager sheet;

FIG. 9 is a diagram showing an example of an screen transition program generated based on the controller sheet;

DESCRIPTION OF THE EMBODIMENT

The preferred embodiment of the present invention will be described with reference to the accompanying drawings.

Figure 1:
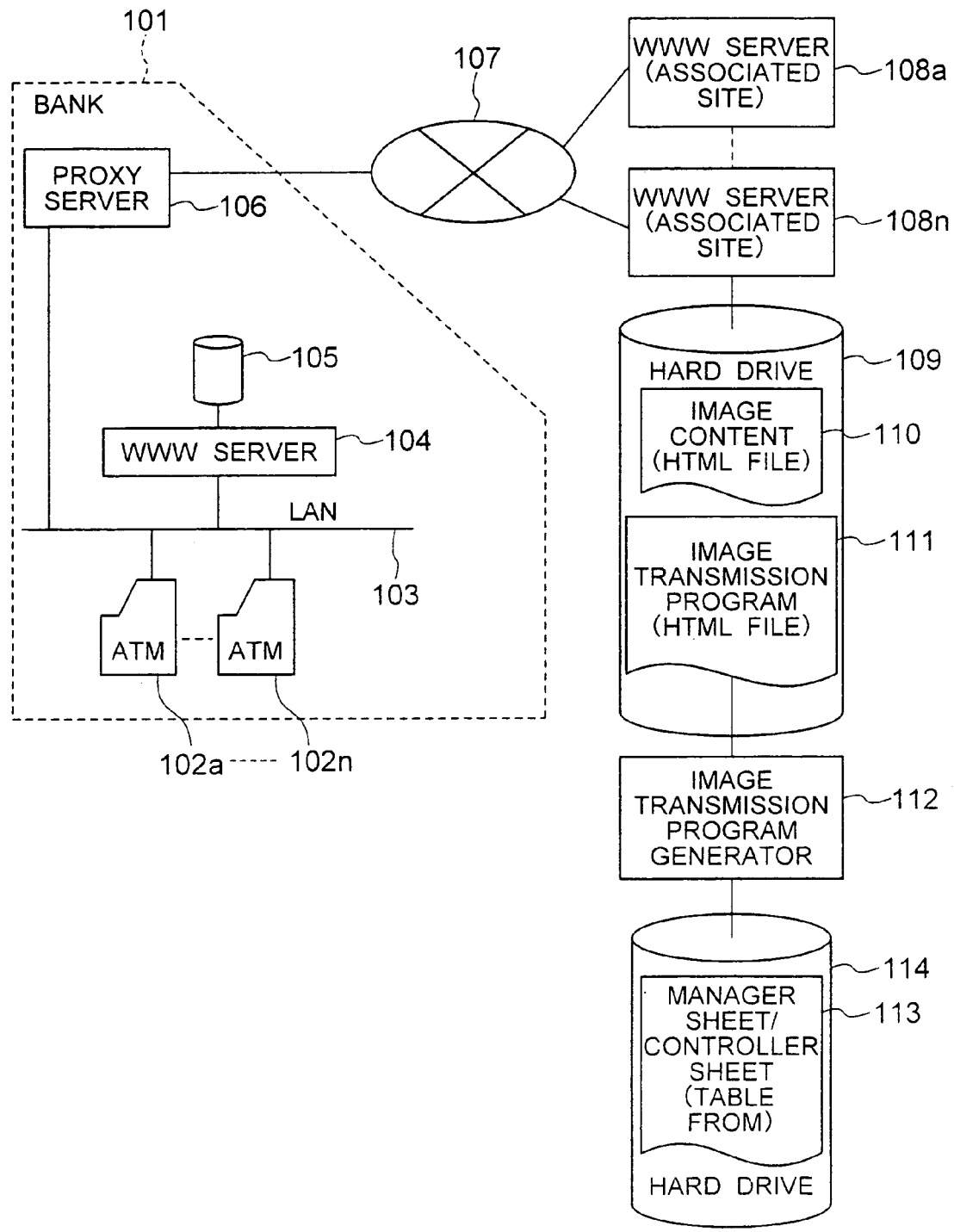
FIG. 1 is a diagram schematically showing an example of system configuration of a Web-compatible ATM to which the present invention is applied.

FIG. 1 is a schematic diagram showing an example of system configuration of a Web-compatible ATM to which the present invention is applied.

In a bank 101, Web-compatible ATMs 102a to 102n are connected through LAN 103 to a WWW server 104.

The Web-compatible ATMs 102a to 102n, by using information (HTML file, for example) downloaded from the WWW server 104, show information on the screen, handle transactions and provide various kinds of services to customers.

The Web-compatible ATMs 102a to 102n make use of services by WWW servers 108a to 108n under affiliation with the bank 101 through the proxy server 106 and the circuits of the Internet 107 and so on.

The WWW servers 104, 108a to 108n are connected to hard drives 105 and 109, which contain the image contents (HTML file) 110 and the screen transition program (HTML file) 111.

The screen transition program 111 is generated by an screen transition program generator 112, which characterizes the present invention.

This screen transition program generator 112 generates an screen transition program (HTML file) based on a manager sheet/controller sheet 113 in table form stored in the hard drive 114. The manager sheet/controller sheet 113 will be described later on. In this embodiment, the manager sheet/controller sheet 113 is stored in the hard drive 114, but may be stored in the hard drive 109.

In this embodiment, the ATMs 102a to 102n are designated as Web-compatible ones and the organization 101 as a bank. However, the ATMs are in a trend toward diversification in service and differentiation in function, so that the equipment to which the present invention is applied may cover items of equipment which are designated as other than ATM and the installation site may be other sectors other than banking facilities.

Figures 2A, 2B:
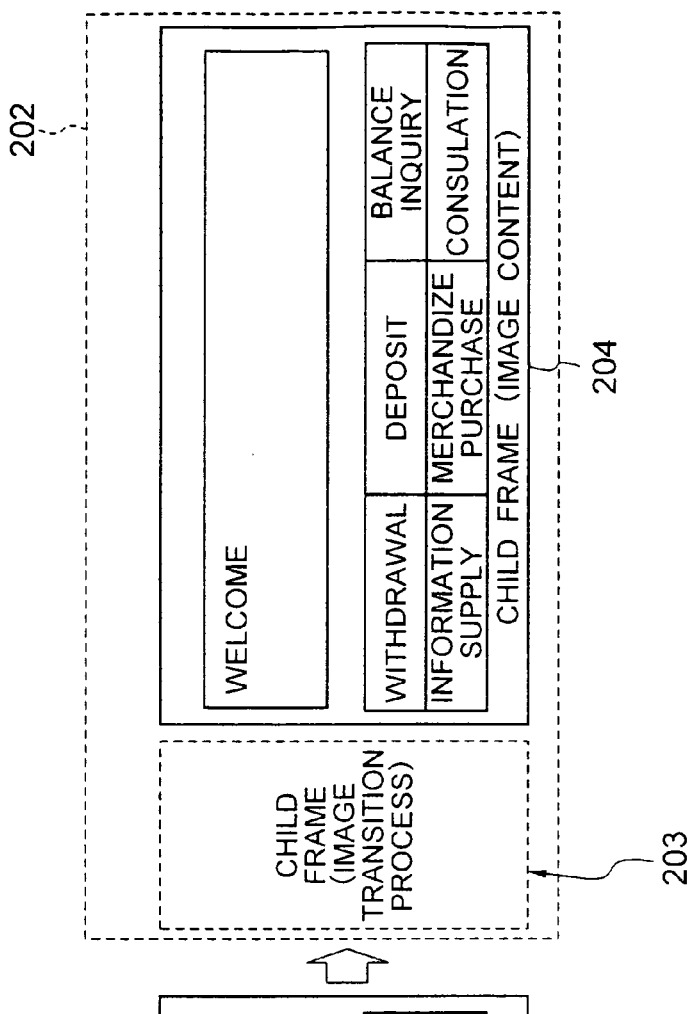
FIGS. 2A, 2B are diagrams showing a frame layout of the ATM screen according to the present invention.

FIGS. 2A and 2B show frame layouts in the present invention. The frames are the demarcation units of the ATM screen, and there is a hierarchical structure for the frames.

With a Web-compatible ATM, the screen appears as indicated at 201. With regard to its hierarchical structure, there is one parent frame 202 and at a lower level, there are a child frame 203 that contains screen transition process information and another child frame 204 that contains image content information.

When the child frame 203 is set to size '0', only the child frame 204 appears on the screen.

FIGS. 3A to 3F show the screen transitions in banking transactions provided by Web-compatible ATMs 102a to 102n.

As an example, a balance inquiry operation is shown in the following.

The screen shows the transaction selection image 301, in which there are the message display area 302 and transaction selection keys 303 (FIG. 3A).

When the balance inquiry key 304 is pressed on the transaction selection image 301, a card insertion waiting image 311 appears (FIG. 3B).

The card insertion-waiting image 311 has an illustration 312 that asks the customer to insert a card, a delete key 313, and a message display area 314.

When a card is inserted, the identification input image 321 appears (FIG. 3C).

When personal identification number keys 322 are pressed to enter four digits on the identification input image 321, the host-related transmission-reception image 331 appears (FIG. 3D).

At the end of transmission or reception to or from the host, the balance display image 341 is shown on the host-related transmission-reception image 331 (FIG. 3E).

The balance display image 341 shows the balance on its message display area 343.

When the Confirm key 342 is depressed, the card reception-waiting image 351 appears (FIG. 3F). While the card reception-waiting image 351 is being shown, when the customer receives the medium such as a card, the transaction selection image 301 appears again (FIG. 3A).

Description will now be made of the method by which to realize changes of images that handle the banking transactions.

FIG. 4 shows the call relations by which to realize the image contents and the screen transitions that appear on the Web-compatible ATMs 102a to 102n.

The manager 401 controls the flow of steps of each transaction.

The controller 402a to 402n decides the next image from the image currently displayed and from an event that occurs in that image and causes an image switchover.

The image content 404a1 to 404nm causes an image to be displayed and performs a process corresponding to an event.

Note that the image content 404a1 to 404nm can be generated by using an ordinary home page generating tool.

The content part 403a to 403n is one process unit in a transaction, such as amount input, identification number input and putting in cash.

For example, in the amount input content part, the amount input image is displayed and the user inputs an amount of money.

If the entered sum of money is incorrect, the amount reentry image appears, and the user inputs an amount of money again. These steps occur in a set sequence.

Generally, one content part consists of a plurality of images.

FIGS. 3A to 3F show representative screen transitions.

FIG. 5 shows how HTML files are loaded to realize the frame layout shown in FIGS. 2A and 2B.

HTML information is divided by a FRAMESET tag into child frames, one called Manager and the other called View.

The Manager frame is currently set to size 0.

FIG. 6 shows a manager sheet 601, in other words, an screen transition table that tabulates the processes of the manager 401 to execute the screen transitions in the example shown in FIGS. 3A to 3F.

The transaction name 602 is "inquiry of balance" in FIG. 6.

The rows 603, vertically stacked, are the content parts, such as "Waiting for card insertion".

The columns 604, horizontally arranged, show the events, such as the "End of process", which occur in each content part.

The squares 605 show the row (line) numbers as transition destinations, which indicate what content part is the next destination when an event occurred in the content part.

If a square 605 is blank, this means that if the specified events have occurred in the content part, this transaction (balance inquiry in the case shown in FIG. 6) is terminated at this point.

Figure 7:
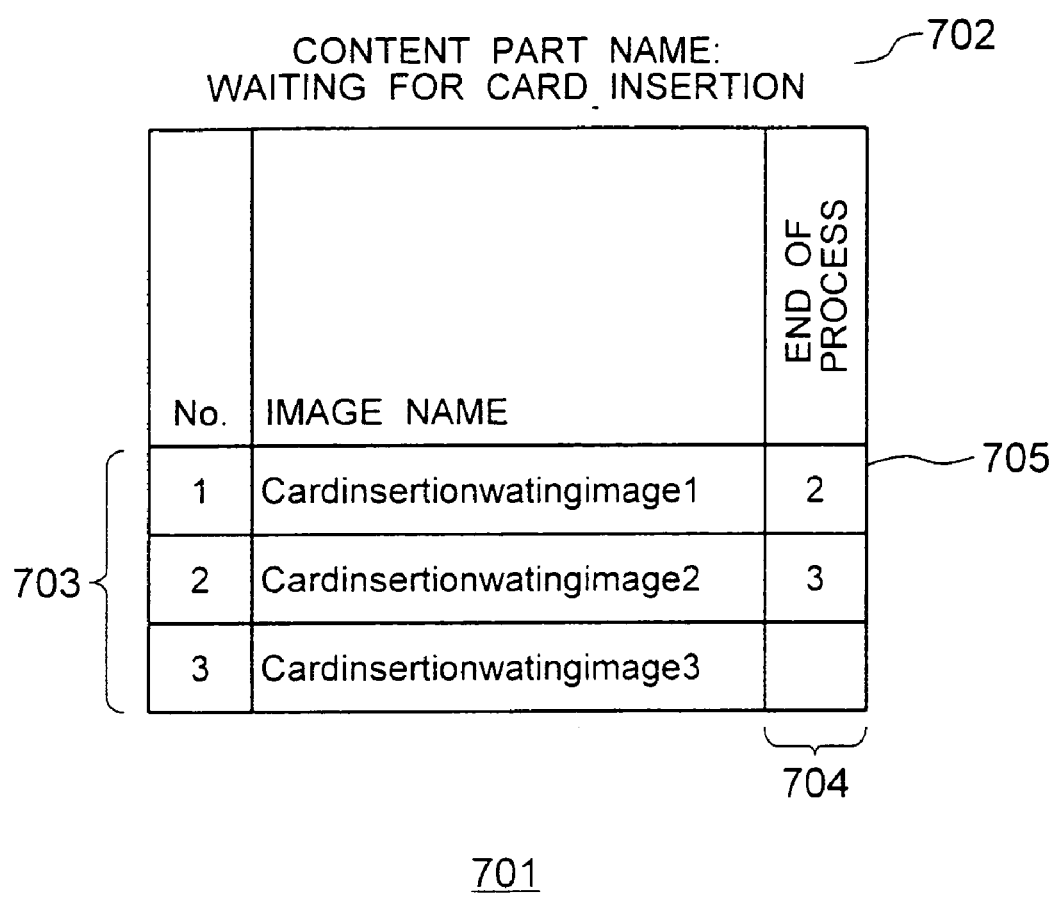
FIG. 7 is a diagram showing an example of a controller sheet.

FIG. 7 is a controller sheet 701, in other words, an screen transition table tabulating the processes of the controller 402 to execute screen transitions in the content part in the example of FIG. 3.

The content part name 702 is "Waiting for card insertion" in this example.

The rows 703, vertically stacked, are the images, such as the Card-insertion-waiting image 1.

The column 704 lists the events, such as waiting for card insertion, which occur in each image.

The squares 705 show the row numbers as transition destinations, which indicate what content part is the next destination when an event occurred in the content part.

If a square 605 is blank, this means that if the specified events have occurred in the content part, this transaction (waiting for card insertion in the case of FIG. 7) is terminated at this point.

Note that generally there are a plurality of controller sheets with respect to one manager sheet.

FIG. 7 shows only one content part titled Waiting for card insertion.

FIG. 8 is an screen transition program 901 generated from the manager sheet 601, simply referred to as a manager.

FIG. 9 is an screen transition program 1001 generated from the controller sheet 701, simply referred to as a controller.

Because generally there are a number of controller sheets, there are controllers, namely, screen transition programs as many as the controller sheets.

FIG. 9 shows only the CardSounyuu.asp portion of the screen transition program.

Figure 10A:
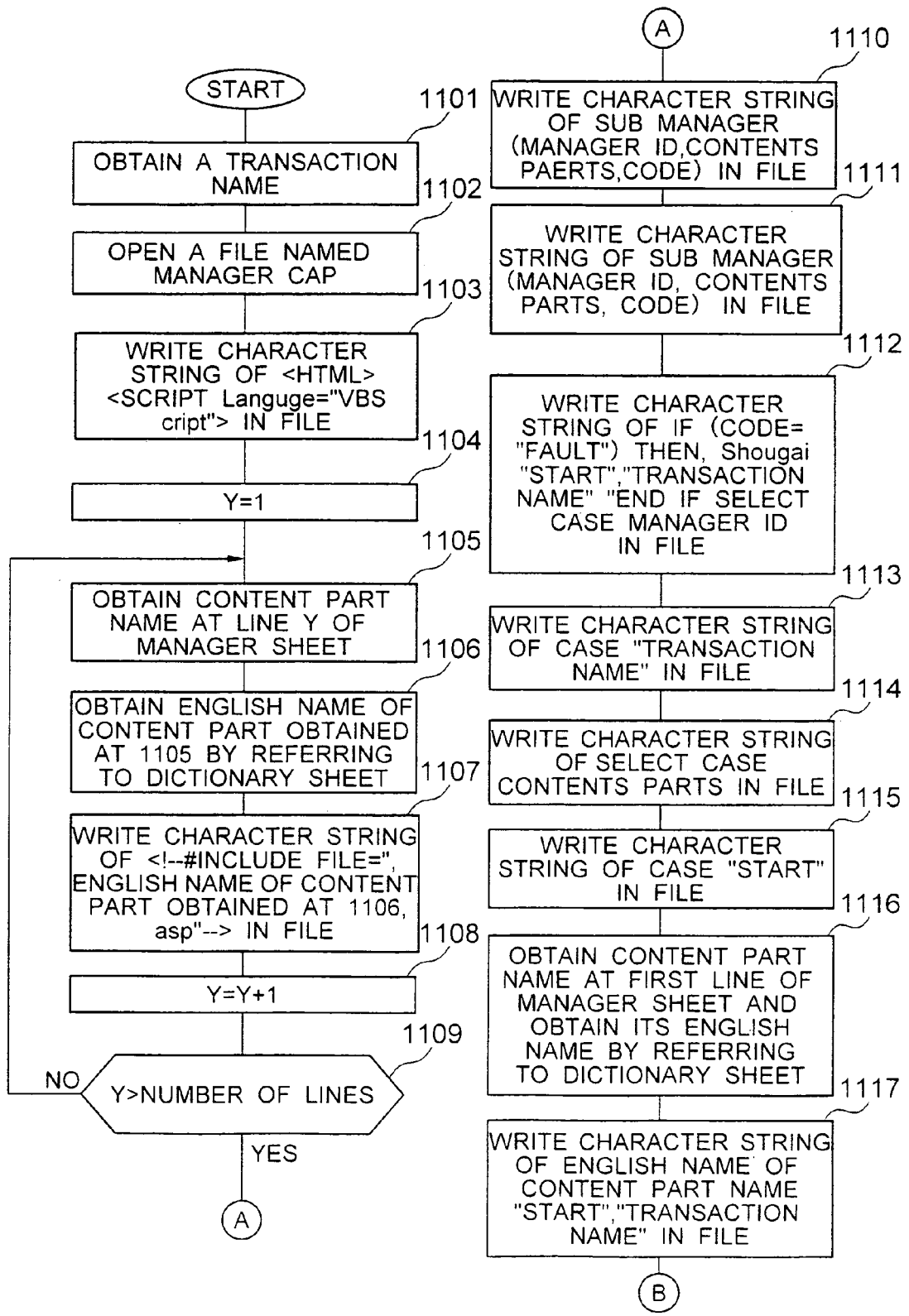
FIG. 10A is a flowchart showing the steps for generating an screen transition program based on the manager sheet.
Figure 10B:
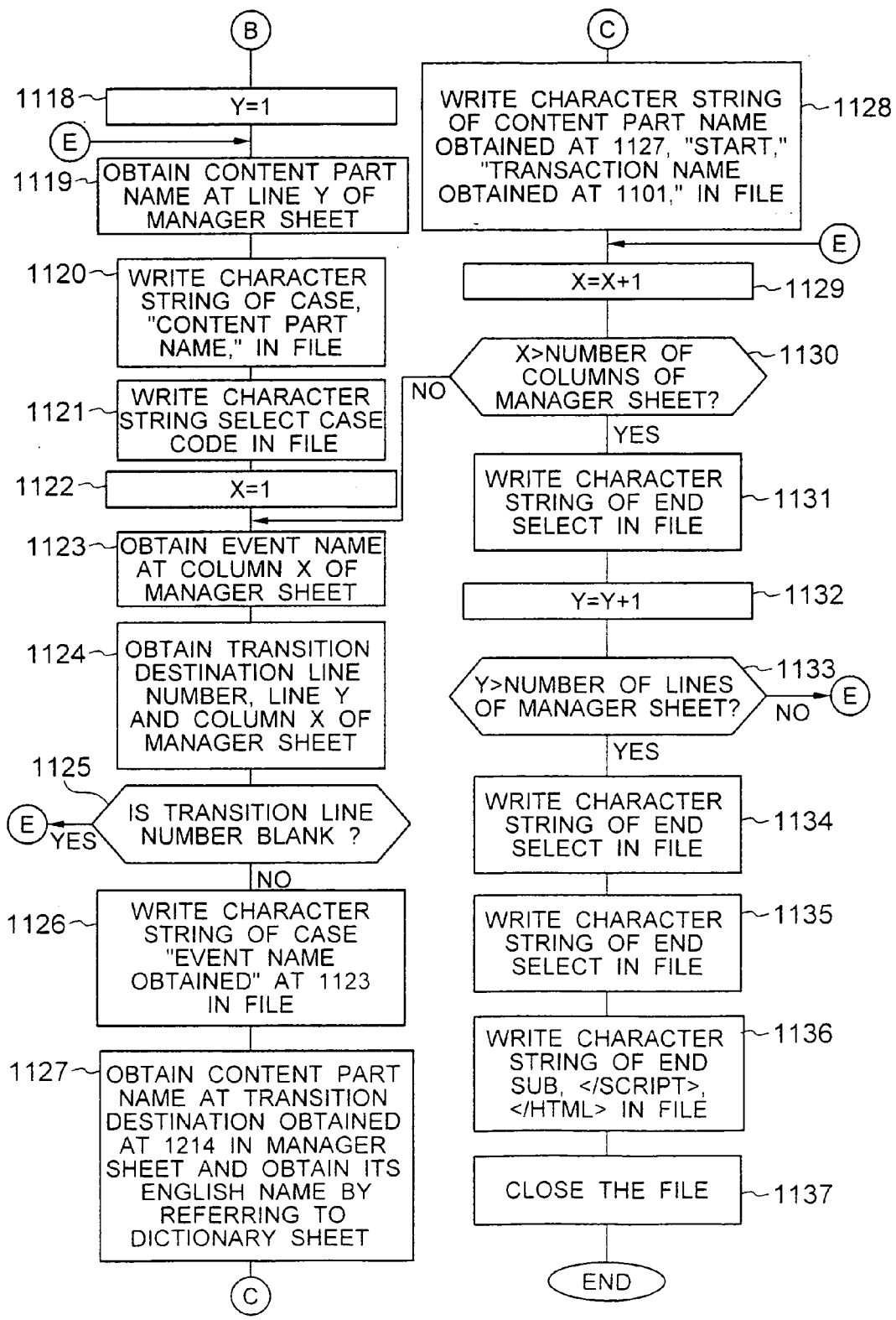
FIG. 10B is a flowchart following the flowchart in FIG. 11A.

FIG. 10A is a flowchart showing the steps for generating an screen transition program 901, in other words, a manager from a manager sheet 601.

At Step 1101, a transaction name is obtained from a manager sheet 601.

At Step 1102, a file titled Manager.asp is opened to write a generated program.

At Step 1103, <HTML>,<SCRIPT languag="VBScript"> is written as a character string.

At Step 1104, variable Y is set as Y=1.

At Step 1105, a content part name at the line Y of the manager sheet 601 is obtained.

At Step 1106, by referring to a dictionary sheet 801, the English name of the content part obtained at Step 1105 is obtained.

At Step 1107, <!--#INCLUDE FILE=", the English name of the content part obtained at Step 1106, asp"--> is written as a character string in a file.

At Step 1108, the variable Y is incremented by 1, i.e. Y=Y+1.

At Step 1109, the variable Y is compared with the number of lines of the manager sheet, and if the variable Y is smaller or equal to the number of lines, the processes from Step 1105 to 1108 are repeated.

At Step 1110, <!--#INCLUDE FILE="Shougai.asp"---> is written as a character string in the file.

At Step 1111, Sub Manager (ManagerID, ContentsParts, Code) is written as a character string in the file.

At Step 1112, If (Code="Fault") then, Shougai "Start", ", the transaction name obtained at Step 1101, ", End if, Select Case ManagerID are written as a character string in the file.

At Step 1113, Case ", the transaction name obtained at Step 1101," is written as a character string in the file.

At Step 1114, Select Case ContentsParts is written as a character string in the file.

At Step 1115, Case "Start" is written as a character string in the file.

At Step 1116, the content part name at the first line of the manager sheet 601 is obtained and its English name is obtained by referring to the dictionary sheet 801.

At Step 1117, the English name of the content part obtained at Step 1116, "Start", ", the transaction name obtained at Step 1101," are written as a character string in the file.

At Step 1118, the variable Y is set as Y=1.

At Step 1119, a content part name at the line Y of the manager sheet 601 is obtained.

At Step 1120, Case ", the content part name obtained at Step 1119 written as a character string in the file.

At Step 1121, Select Case Code is written as a character string in the file.

At Step 1122, the variable X is set as X=1.

At Step 1123, the event name at the column X of the manager sheet 601 is obtained.

At Step 1124, the transition destination, the line Y and the column X, in the manager sheet 601 is obtained.

At Step 1125, if the transition destination obtained at Step 1124 is blank, the following processes from Step 1126 to 1128 are skipped.

At Step 1126, Case ", the event name obtained at Step 1123 is written as a character string in the file.

At Step 1127, the content part name at that line number of the transition destination in the manager sheet 601 which was obtained at Step 1124 is obtained, and its English name is obtained by referring to the dictionary sheet 801.

At Step 1128, the English name of the content part, obtained at Step 1124, "Start", the transaction name obtained at Step 1101 are written as a character string in the file.

At Step 1129, the variable X is incremented by 1, i.e. X=X+1.

At Step 1130, the variable X is compared with the number of columns of the manager sheet 601 and if the variable X is smaller than or equal to the number of columns, the processes from Step 1123 to Step 1129 are repeated.

At Step 1131, End Select is written as a character string in the file.

At Step 1132, the variable Y is incremented by 1, i.e., Y=Y+1.

At Step 1133, the variable Y is compared with the number of lines of the manager sheet 601, and if the variable Y is smaller or equal to the number of lines, the processes from Step 1119 to Step 1120 are repeated.

At Step 1134, End Select is written as a character string in the file.

At Step 1135, End Select is written as a character string in the file.

At Step 1136, End Sub, </SCRIPT>, </html> are written as a character string in the file.

At Step 1137, the file is closed.

Figure 11A:
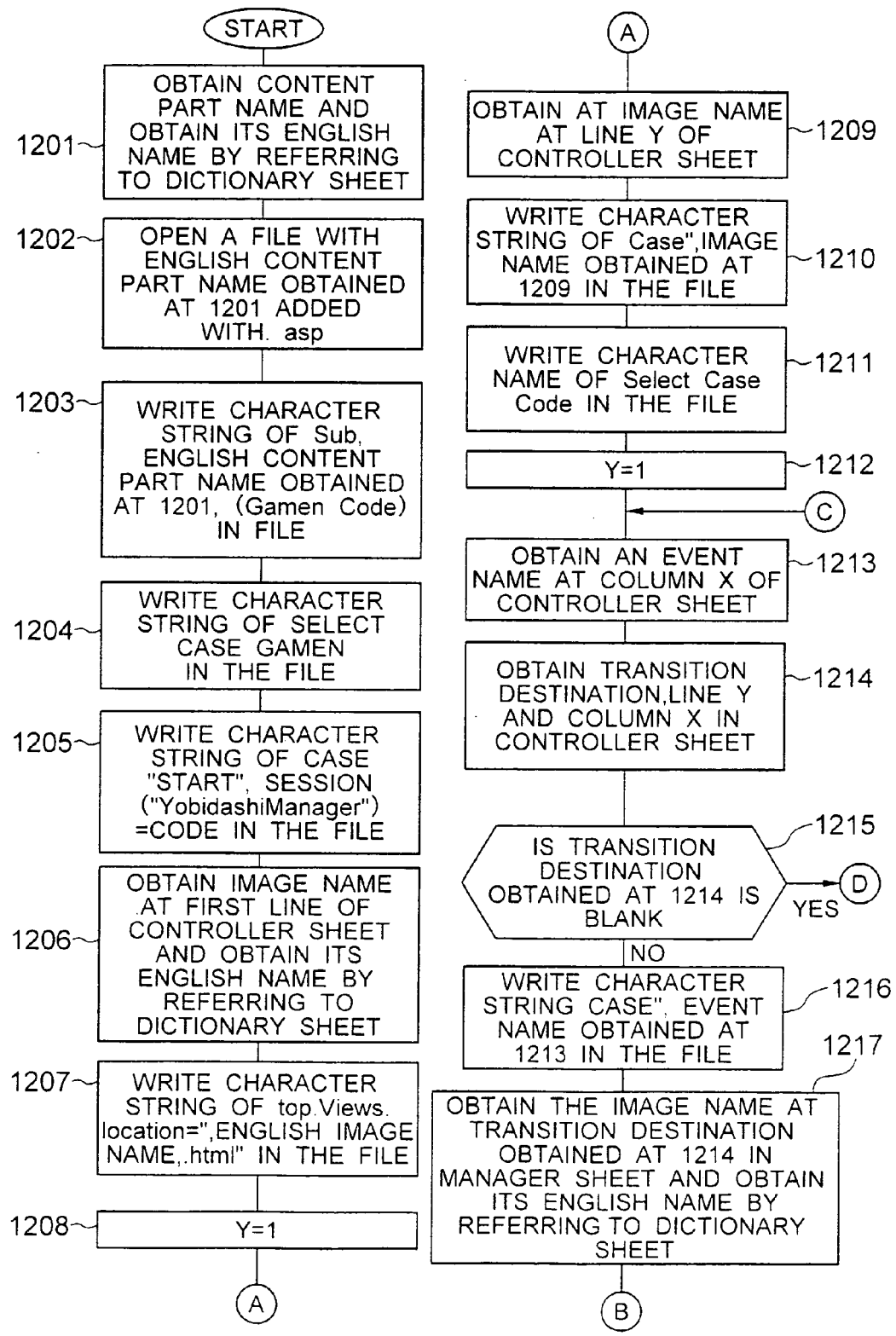
FIG. 11A is a flowchart showing the steps for generating an screen transition program based on the controller sheet.
Figure 11B:
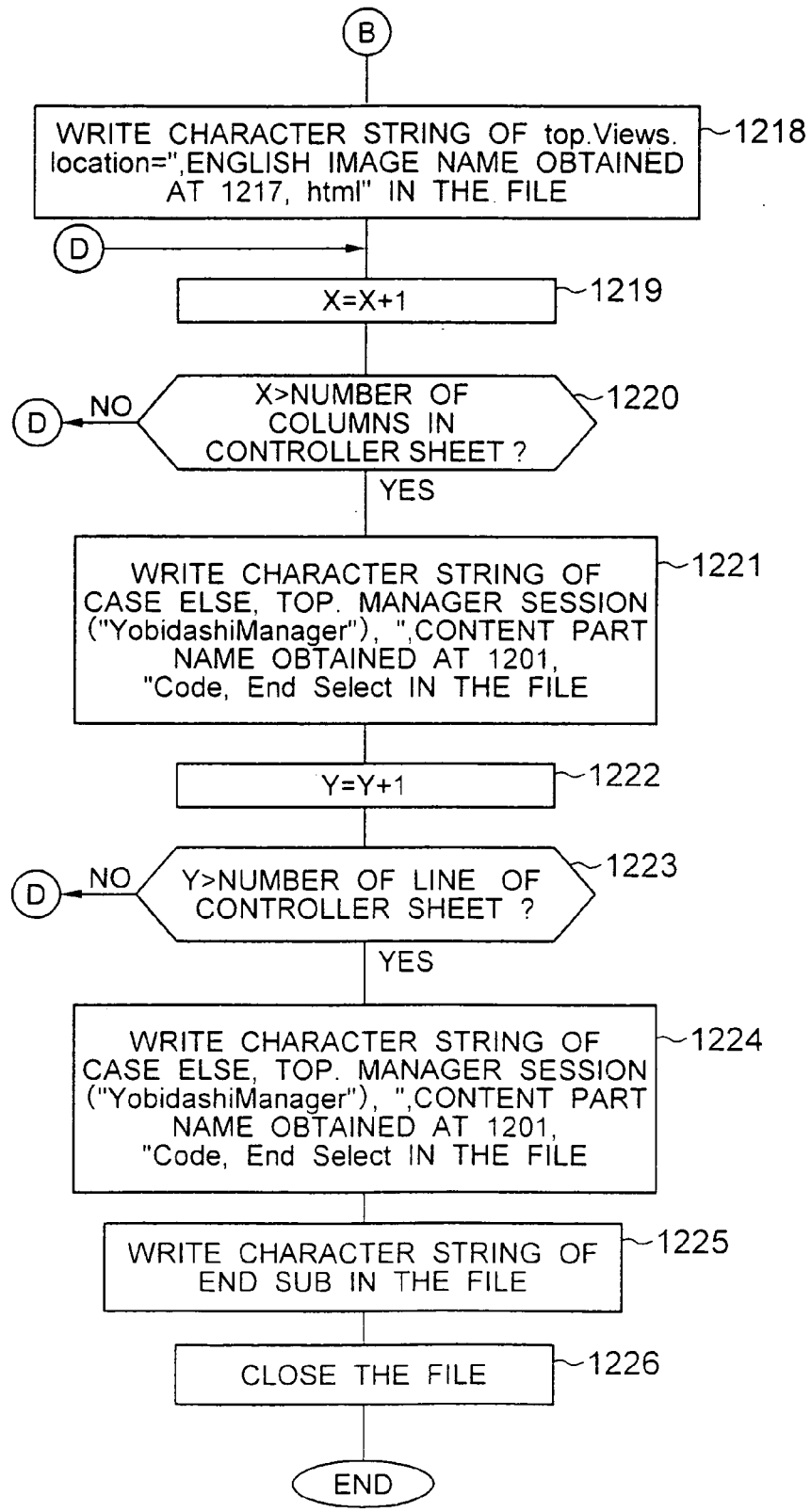
FIG. 11B is a flowchart following the flowchart in FIG. 11A.

FIGS. 11A and 11B are flowcharts showing the steps for generating the screen transition program 1001, in other words, the controller 1001 from the controller sheet 701.

At Step 1201, a content part name is obtained from the controller sheet 701, and its English name is obtained by referring to the dictionary sheet 801.

At Step 1202, a file with the English content part name, obtained at Step 1201 and added with .asp is opened.

At Step 1203, Sub, the English content part name obtained at Step 1201, (Gamen Code) are written as a character string in the file.

At Step 1204, Select Case Gamen is written as a character string in the file.

At Step 1205, Case "Start", Session "YobidashiManager")=Code are written as a character string in the file.

At Step 1206, the image name at the first line of the controller sheet 701, and its English name is obtained by referring to the dictionary sheet 801.

At Step 1207, top.View.location=", the English image name obtained at Step 1206, .html" are written as a character string in the file.

At Step 1208, set the variable Y=1.

At Step 1209, an image name at the line Y of the controller sheet 701 is obtained.

At Step 1210, Case ", the image name obtained at Step 1209 is written as a character string in the file.

At Step 1211, Select Case Code is written as a character string in the file.

At Step 1212, set the variable X=1.

At Step 1213, an event name at the column X of the controller sheet 701 is obtained.

At Step 1214, the transition destination, the line Y and the column X, in the controller sheet 701 is obtained.

At Step 1215, if the transition destination obtained at Step 1214 is blank, the following processes from Step 1126 to 1128 are skipped.

At Step 1216, Case ", the event name obtained at Step 1213 is written as a character string in the file.

At Step 1217, the content part name at the transition destination obtained at Step 1214 in the manager sheet 601 is obtained and its English name is obtained with reference to the dictionary sheet 801.

At Step 1218, top.View.location=", the English image name obtained at Step 1217, html" is written as a character string in the file.

At Step 1219, the variable X is incremented by 1, i.e., X=X+1.

At Step 1220, the variable X is compared with the number of columns of the controller sheet 17, and if the variable X is smaller than or equal to the number of columns, the processes from Step 1213 to 1219 are repeated.

At Step 1221, Case Else, Top.Manager.Session ("YobidashiManager"), ", the content part name obtained at Step 1201, ", Code, End Select are written as a character string in the file.

At Step 1222, the variable Y is incremented by 1, i.e., Y=Y+1.

At Step 1223, the variable Y is compared with the number of lines of the controller sheet 701, and if the variable Y is smaller than or equal to the number of lines, the processes from Step 1209 to Step 1222 are repeated.

At Step 1224, Case Else, top.Manager.Manager Session ("YobidashiManager"), ", the content part name obtained at Step 1201, , ", Code, End Select are written as a character string in the file.

At Step 1225, End Sub is written as a character string in the file.

At Step 1226, the file is closed.

Description has been made of the Web-compatible ATM according to the present invention, but the present invention is not limited to the Web-compatible ATM, and can be applied to other business systems or various kinds of information terminals.

According to embodiments of the present invention, the images and the screen transition information of the Web-compatible ATM can be generated and managed independently of each other. Therefore, it becomes possible to prepare image description files in advance and select which file to use.

Further, it becomes possible to easily control the screen transitions according to an screen transition table.

It is easy to divide work between ATM image generation and screen transition table generation.

The scope of application of the present invention is effective not only to Web-compatible ATMs but also to other business systems and various kinds of information terminals.

What is claimed is:

1. A screen transition method for executing a screen transition process in a web compatible ATM for sequentially changing a series of image contents to display images on the screen by the images, comprising the steps of:
   describing in table form the processing items in the screen transition process, said screen transition process changing a current image to the next one at the end of display of each individual image content of said series of image contents;
   sequentially reading the processing items described in table form and carrying out said screen transition process of said series of image contents; and
   wherein said table form includes information indicating the contents of a transaction, a content part indicating processing units in a previous transaction and events generated in said content part, to describe a next content part of a next destination in said event while said event is occurring in said content part.

2. A screen transition method for executing a screen transition process in a web compatible ATM for sequentially changing a series of image contents to display images on the screen, comprising the steps of:
   generating content parts, each showing processing units, in the screen transition process and a manager sheet describing events in the content parts as processing items in table form;
   generating a controller sheet describing the processing items in the screen transitions in said content parts in table form;
   sequentially reading the processing items described in said manager sheet and generating a manager to control the flow of a series of processes corresponding to the read processing items;
   sequentially reading the processing items described in said controller sheet and generating a controller to decide the next image corresponding to the read processing item;
   operating said controller according to said manager to change the images; and
   wherein said table form includes information indicating the contents of a transaction, a content part indicating processing units in a previous transaction and events generated in said content part, to describe a next content part of a next destination in said event while said event is occurring in said content part.

3. A screen transition system for executing the screen transition process in a web compatible ATM sequentially changing a series of image contents to display images on the screen, comprising:

a plurality of unit-of-processing component parts, each having a unit-of-processing image storage containing a series of image contents for each specified unit of processing, and a controller, connected to said unit-of-processing image storage, for deciding the next screen transition;

a manager, connected to said plurality of unit-of-processing component parts, for controlling the flow of one unit of processing, wherein the manager defines and manages the series of image contents which are further divided by the controller for more detailed definition and management; and wherein said system includes information indicating the contents of a transaction, a content part indicating processing units in a previous transaction and events generated in said content part, to describe a next content part of a next destination in said event while said event is occurring in said content part.

4. A screen transition method for performing the screen transition process in a web compatible ATM sequentially changing a series of image contents to display images on the screen, comprising the steps of:

storing in a file a sheet describing the processing items of the screen transition process in table form and a screen transition program generator, wherein said screen transition program generator sequentially reads the processing items from said sheet, sequentially writes in the file necessary program descriptions corresponding to the read processing items, and generates a screen transition program on the file wherein said method provides information indicating the contents of a transaction, a content part indicating processing units in a previous transaction and events generated in said content part, to describe a next content part of a next destination in said event while said event is occurring in said content part.

5. A method for generating screen transitions to carry out the screen transition process in a web compatible ATM sequentially changing a series of image to carry out the screen transition process to display images on the screen, comprising the step of:

storing content parts in the screen transition process and a manager sheet describing in table form events that occur in the content part as processing items, and a controller sheet describing said processing items in the content part in table form and a screen transition program generator in a file, wherein said screen transition program generator sequentially reads said processing items described in the manager sheet, sequentially writes, in the file, necessary program descriptions corresponding to the read processing items, generates a manager, and sequentially reads said processing items described in the controller sheet, sequentially writes, in the file, necessary program descriptions corresponding to said read processing items, generates a controller, and generates a screen transition program consisting of said manager and said controller on the file wherein said system provides information indicating the contents of a transaction, a content part indicating processing units in a previous transaction and events generated in said content part, to describe a next content part of a next destination in said event while said event is occurring in said content part.

* * * * *